3,445,279
PROCESS OF MAKING URON RESINS AND PRODUCTS THEREOF INCLUDING MODIFIED TEXTILE FABRICS
David H. Abrahams, New Rochelle, and Leo Goldberg, Bayside, N.Y., assignors to Dexter Chemical Corporation, a corporation of New York
No Drawing. Filed July 9, 1964, Ser. No. 381,511
Int. Cl. C08g 9/24; D06m 15/58
U.S. Cl. 117—143                                15 Claims

ABSTRACT OF THE DISCLOSURE

Uron resins, made by reacting at least 4 mols of formaldehyde per mole of urea, dehydrating the resulting product to methylol uron and etherifying the methylol uron to alkoxymethyl uron, are improved as textile finishing agents by reacting controlled proportions of excess formaldehyde for at least one-half hour with the resin material after the dehydration step and before the etherification step.

---

This invention relates to uron resins and, more particularly, to improved methods of making such resins and to the improved resins which may be produced by such methods.

Uron resins are used in the textile industry as finishing agents to impart wrinkle resistance and shrinkage control to fabric materials, particularly the so-called "wash and wear" fabrics. These resins are produced by reacting urea and formaldehyde to form tetramethylol urea, which is then subjected to dehydration. Although not conclusively proven, it is generally believed by persons skilled in the ar that during dehydration one mol of water is eliminated between two adjacent N,N'-methylol groups to form a ring compound of the formula

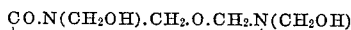
$$\underline{CO.N(CH_2OH).CH_2.O.CH_2.N}(CH_2OH)$$

namely, N,N'-bis(methylol)uron. The two methylol groups of this compound are then etherified by acid reaction with an aliphatic alcohol to form a diether of the formula

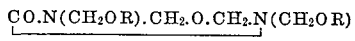
$$\underline{CO.N(CH_2OR).CH_2.O.CH_2.N}(CH_2OR)$$

namely, N,N'-bis(alkoxymethyluron, and it is this material which is denoted as uron resin and used conventionally for textile finishing.

While the uron resins give valuable benefits as finishing agents, they are not entirely without drawbacks. For example, certain problems are encountered in the manufacture of the resins, chiefly because of the unstable character of some of the intermediate products, low yields, and the lack of means or prohibitive cost of separating unreacted, potentially harmful residues from the resins. These problems, in turn, cause adverse effects in the performance of the resins such as poor resistance to laundering, excessive chlorine retention, fabric "scorching," etc. That such shortcomings are not unimportant is evidenced by the considerable effort that has been made in the art to find and develop additives for separate mixing with prepared uron resins to overcome their deficiencies as outlined above.

Now, as distinguished from the additive route, we have discovered a basic improvement which may be used in the manufacture of uron resins to improve the characteristics of the final resins in a surprising and unexpected manner. Specifically, we have found that the addition of defined quantities of excess formaldehyde to a reaction mixture containing N,N'-bis(methylol)uron, prior to etherification of the mixture and after dehydration thereof, and the subsequent reaction of said excess formaldehyde into the mixture results in vastly improved uron resins, as demonstrated by application thereof to textile materials and performance evaluations. In some cases, the characteristics of the resins are so substantially improved that the use of conventional additives to achieve comparable levels of performance can be eliminated entirely. Such results make the process and products of our invention extremely valuable for both the practical and the commercial viewpoint.

Briefly described, our new process involves reacting urea and formaldehyde in suitable proportions to form tetramethylol urea, dehydrating the resulting reaction mixture to eliminate one mol of water from the tetramethylol urea contained therein and thereby form N,N'-bis(methylol)uron, and then in accordance with the invention adding to the reaction mixture from about 3 to about 50 mol percent of excess formaldehyde based on the total number of mols of urea and formaldehyde originally reacted, reacting said excess formaldehyde into said reaction mixture for at least about one-half hour and finally etherifying said N,N'-bis(methylol)uron to form improved N,N'-bis(alkoxymethyl)urons. In more commercial embodiments of the invention, from about 9.5 to about 35 mol percent of excess formaldehyde are added and reacted into the reaction mixture for at least about one hour.

As noted above, the first step in our process involves reacting urea and formaldehyde in suitable proportions to form tetramethylol urea which is done in conventional manner. Generally speaking, at least 4 mols of formaldehyde or slightly more are mixed with each mol of urea to form a reaction mixture in aqueous medium, the water being contributed by the aqueous solution of formaldehyde which is convenient to use. Ordinarily, the pH is then made alkaline, for example by addition of sodium hydroxide, and the mixture is next heated at temperatures up to atmospheric reflux from anywhere between 1 to 3 hours to form tetramethylol urea. While the name tetramethylol urea implies a well defined compound, under certain conditions the reaction product exhibits characteristics which suggest a configuration corresponding to dimethylol urea plus two free mols of formaldehyde. Hence, while the reaction product may be somewhat unstable in structure, it is conventionally referred to as tetramethylol urea and this is sufficiently accurate for the purpose of this invention.

Following the reaction to form tetramethylol urea, the reaction mixture is next dehydrated to eliminate 1 mol of water between adjacent N,N'-methylol groups and thereby form N,N'-bis(methylol)uron. The dehydration is desirably carried out under vacuum to lower the temperature required to drive off water, although this is not necessary and higher temperatures may be used. The resulting syrupy liquid contains N,N'-bis(methylol)uron which is an unstable compound formed conventionally in amounts up to about 50% of the theoretical yield. The reaction mixture at this stage contains not only N,N'-bis(methylol)uron but other unreacted residues such as mono, di, tri and tetramethylol ureas and possibly alkylene ureas, etc.

In accordance with the invention, excess formaldehyde is now added to the reaction mixture in amounts within the range from about 3 to about 50 mol percent based on the total number of mols of urea and formaldehyde originally reacted. For example, if 10 mols of urea and 40 mols of formaldehyde were used in the original reaction to form tetramethylol urea, then anywhere from about 1.5 to about 25 mols of excess formaldehyde can be added. Also, as previously noted, in more commercial embodiments the amount of added formaldehyde can be from about 9.5 to about 35 mol percent or correspondingly from about 4.75 to 17.5 mols of formaldehyde in the case of the original 50 mols example described above. The excess formaldehyde may be added in the form of the known commercial 37% and 44% aqueous solutions or the formaldehyde may be in anhydrous form with suitable additions of water or other solvents to dilute the reaction mixture for carrying on additional reaction.

Following its addition, the excess formaldehyde, is caused to react with or into the reaction mixture for at least about ½ hour and preferably for at least about 1 hour. The reaction can be carried out at any temperature from ambient to atmospheric reflux. The temperature of reaction will vary inversely with the time so that the reaction time can be shortened with the use of higher reaction temperatures.

While we have no direct proof of the fact, it is our opinion that the excess formaldehyde in part actually increases the yield of N,N'-bis(methylol)uron and also in some unknown manner either combines with or modifies the unreacted residues into a form that will not adversely affect the beneficial characteristics of the uron resins subsequently formed and applied to textile fabrics. At any rate, the addition and reaction of the excess formaldehyde gives a very substantial improvement in the finishing qualities of the final uron resins for textiles, as will be evident in the examples to follow.

After the formaldehyde has been reacted into the reaction mixture, the mixture may be once more dehydrated to form the maximum possible amount of N,N'-bis(methylol)uron and thereafter the uron compound is etherified with aliphatic alcohol. Etherification is usually carried out with one or more alcohols of 1 to 6 carbon atoms, preferably of the straight chain variety, and conventionally the etherification is carried out at an acid pH. In the usual procedure, the dehydrated reaction mixture is dissolved in the alcohol with which it is to be etherified, for example, methanol, and the pH is then adjusted to 3.0 or lower by addition of an inorganic acid, e.g. sulphuric acid. The mixture is then agitated for anywhere from ½ to about 2 hours at temperatures up to atmospheric reflux to form the corresponding N,N'-bis(alkoxymethylol)uron.

The uron resin so obtained can be applied to textile fabrics alone or mixed with other materials in conventional manner. Usually, the resin is applied in the form of an aqueous solution containing from about 2.5 to about 10% of resin solids and the resin is cured upon the fabric for a period of about 1 to 10 minutes at temperatures anywhere from 180 to 450° F. When so applied, the uron resins formed in accordance with the methods described above give substantially improved properties as compared to uron resins of conventional manufacture.

The following examples will illustrate further details of the invention and in the opinion of the inventors represent the best modes presently contemplated of carrying out the invention. Unless otherwise indicated, all values for mol percent formaldehyde are based on the total number of mols of urea and formaldehyde used in the original reaction mixtures.

Example 1

To a mixture containing 78.5 grams (1.31 mols) of urea and 188.5 grams (6.28 mols) of formaldehyde was added sufficient sodium hydroxide to adjust the pH to 10, and the mixture was then refluxed at atmospheric pressure for about 1 to 1½ hours. At the end of this time, water was stripped from the product under vacuum, and the resulting N,N'-bis(methylol)uron was dissolved in 200 grams (6.26 mols) of methanol.

The pH of the alcohol solution was adjusted to 2.5 with sulphuric acid and the solution was agitated for 1 hour at a temperature of 50° C. The sulphuric acid was then neutralized with sodium hydroxide and excess alcohol was evaporated by heating under vacuum, leaving substantially anhydrous N,N'-bis(methoxymethyl)uron. This material was labeled sample A and served as a control in tests to be described below.

The foregoing procedure was repeated but modified in accordance with the invention to prepare an improved N,N'-bis(methoxymethyl)uron which was labeled sample B. In preparation of sample B, 3.5 mol percent of excess formaldehyde was added to the dehydrated reaction mixture of the sample A procedure prior to etherification with methanol, and the resulting mixture was heated to atmospheric reflux for about 1 hour at alkaline pH. Thereafter, the reaction mixture was etherified with methanol at acid pH by the method described for sample A to complete the preparation of sample B.

The procedure described for preparation of sample B was repeated to form additional samples of improved N,N'-bis(methoxymethyl)uron which were labeled samples C, D and E. In sample C, 8.6 mol percent of excess formaldehyde was added; in sample D, 17.3 mol percent of formaldehyde was added; and in sample E, 34.6 mol percent of formaldehyde was added.

Each of the foregoing samples was incorporated in a fabric dipping solution which comprised 5% by weight of the resin sample plus 0.8% of zinc nitrate catalyst dissolved in water. A cotton fabric was padded with each dipping solution, dried at 140° F. for 10 minutes and the resin then cured at 340° F. for 1½ minutes. The resin-treated fabrics were then subjected to 20 successive launderings, each laundering cycle consisting of washing in 140° F. wash water in a front loading Westinghouse washing machine, normal cycle, and using commercial detergent and one-half cup of chlorine bleach, followed by drying in a tumble dryer.

The laundered fabrics were then tested for warp crease recovery, measured according to the standard test "Wrinkle Recovery Tester Method," test No. 66–1959T, described on page B–128 of the Technical Manual and Yearbook of the American Association of Textile Chemists and Colorists, 1962 edition, vol. 38. The laundered fabrics were also tested for loss of tensile strength according to the actual scorching portion of the standard test "Damage by Retained Chlorine," test No. 92–1962, described on page B–92 of the same manual.

The results of these tests for all of the samples were as follows:

| Sample | Crease recovery | Percent loss, tensile strength |
|---|---|---|
| A | 117.0 | −23 |
| B | 118.0 | −17 |
| C | 119.0 | −10 |
| D | 121.0 | −10 |
| E | 134.0 | −5 |

As will be noted, all of the samples prepared with excess formaldehyde in accordance with the invention gave improvements in the crease recovery and percent loss of tensile strength as compared to the control sample A, and the improvements increased in magnitude as greater amounts of excess formaldehyde were used.

Example 2

The procedures of Example 1 were substantially repeated except that sample A was prepared by reacting 78.5 grams (1.31 mols) of urea and 165 grams (5.5 mols) of formaldehyde in the manner described in Example 1. Sample B was prepared by adding and reacting 11.5 mol percent of excess formaldehyde in the manner described in Example 1 and sample C was prepared with 30.8 mol percent of excess formaldehyde.

Samples A, B and C were then applied to cotton fabric, laundered and tested for warp crease recovery and percent loss in tensile strength in the same manner as described in Example 1.

The result of these tests were as follows:

| Sample | Crease recovery | Percent loss, tensile strength |
|---|---|---|
| A | 118.0 | −29 |
| B | 118.0 | −21 |
| C | 132.0 | −12 |

As will be noted, the uron resins prepared in accordance with the invention again gave substantial improvement in the warp crease recovery and percent loss in tensile strength according to the amount of excess formaldehyde used.

Example 3

In order to determine the effect of including the excess formaldehyde as part of the original reaction mixture rather than adding it in a second separate step to the dehydrated reaction mixture containing N,N'-bis(methylol) uron, 79 grams (1.32 mols) of urea were mixed with 229 grams (7.63 mols) of formaldehyde for preparation of an uron resin by the procedure used in Example 1 to prepare sample A. Such proportions in the original reaction mixture represented an excess of 36 mol percent of formaldehyde based on the 5 mols total of urea and formaldehyde (1:4 ratio respectively) required to form tetramethylol urea. Following reaction, dehydration, and etherification with methanol, the resulting N,N'-bis(methoxymethyl)uron resin was applied to cotton fabric, cured thereon, laundered and tested for warp crease recovery and loss of tensile strength in the manner described in Example 1.

The result of these tests were as follows:

Crease recovery _____ 126.0
Percent loss, tensile strength _____ −17

As will be noted, when the excess formaldehyde was included in the original reaction mxture, the resulting uron resin gave improvements in the warp crease recovery and the percent loss of tensile strength as compared to the control samples A in both Examples 1 and 2. However, the improvements obtained by adding the excess formaldehyde to the original reaction mixture are much more limited than when the excess formaldehyde is added in a second separate step to the dehydrated reaction mixture. This is illustrated by comparison of the foregoing results with those specified in Example 1 for sample D where almost the same amount of excess formaldehyde was added in a second separate step but the improvement in loss in tensile strength was of greater magnitude.

For this reason, it is preferred that at least about 17 mol percent of excess formaldehyde be used whenever it is to be included as part of the original reaction mixture, the amount of excess formaldehyde being taken on the total number of mols of urea and formaldehyde which are mixed for reaction in 1:4 proportions respectively. While the process of including excess formaldehyde in the original reaction mixture can give only limited benefits and is much less preferred, it may be found useful in special circumstances and therefore is not entirely without value in producing improved uron resins.

It will be understood that it is intended to cover all changes and modifications of the preferred embodiments of the invention herein chosen for the purpose of illustration, which do not constitute departures from the spirit and scope of the invention.

What is claimed is:

1. In the process of manufacturing uron resins by mixing and reacting urea with formaldehyde to form tetramethylol urea, dehydrating the same to form N,N'-bis(methylol)uron and etherifying the latter to form N,N'-bis(alkoxymethyl)uron, the improvement which comprises adding, after said dehydration and prior to said etherification, from about 3 to about 50 mol percent of excess formaldehyde based on the total number of mols of urea and formaldehyde originally reacted, and reacting said excess formaldehyde for at least about one-half hour with reactive components of the material to which it has been added before said etherification is effected.

2. The improvement as in claim 1 wherein said excess formaldehyde is added in amounts from about 9.5 to about 35 mol percent.

3. The improvement as in claim 1 wherein said excess formaldehyde is reacted for up to about 3 hours.

4. The improvement as in claim 1 wherein said excess formaldehyde is reacted at from about ambient to about atmospheric reflux temperature.

5. Process of manufacturing improved uron resins which comprises reacting urea with formaldehyde in the proportions of at least 4 mols of formaldehyde for each mol of urea to form tetramethylol urea, dehydrating said tetramethylol urea to form N,N'-bis(methylol)uron, then adding thereto from about 3 to about 50 mol percent of excess formaldehyde based on the total number of mols of urea and formaldehyde originally reacted, reacting said excess formaldehyde for at least about one-half hour with reactive components associated with said N,N'-bis(methylol)uron and etherifying said N,N'-bis(methylol)uron with aliphatic alcohol having one to six carbon atoms to form N,N'-bis(alkoxymethyl)uron.

6. Process as in claim 5 wherein said excess formaldehyde is added in amounts from about 9.5 to about 35 mol percent and reacted for at least about one hour.

7. Process as in claim 5 wherein said excess formaldehyde is reacted for up to about 3 hours.

8. Process as in claim 5 wherein said excess formaldehyde is reacted at from about ambient to about atmosphere reflux temperature.

9. Process as in claim 5 wherein said excess formaldehyde is added in the form of an aqueous solution.

10. Process as in claim 5 wherein approximately 4.5 mols of formaldehyde are originally reacted with each mol of urea and wherein said excess formaldehyde is reacted for about 1 hour at atmospheric reflux temperature.

11. Process as in claim 5 wherein said N,N'-bis(methylol)uron is etherified with methanol at a pH below 3.0.

12. Process as in claim 5 wherein said N,N'-bis(alkoxymethyl)uron is applied to a textile material and cured thereon for about 1 to about 10 minutes at about 180° to about 450° F.

13. Uron resin made by the process of claim 5.

14. Modified textile material produced by the process of claim 12.

15. Process as in claim 5 which includes the step of dehydrating the reaction mixture a second time after the reaction of said excess formaldehyde and before said etherification.

References Cited

UNITED STATES PATENTS

| | | | |
|---|---|---|---|
| 2,485,203 | 10/1949 | Kvalnes et al. | 260—69 |
| 2,548,416 | 4/1951 | Barsky et al. | 260—67.6 |
| 3,048,500 | 8/1962 | Musser et al. | 117—139.4 |
| 3,089,859 | 5/1963 | Oshima | 260—45.2 |

WILLIAM H. SHORT, *Primary Examiner.*

H. SCHAIN, *Assistant Examiner.*

U.S. Cl. X.R.

260—29.4, 70; 117—139.4, 161; 8—116.3